(12) United States Patent
Murphy et al.

(10) Patent No.: US 8,386,477 B1
(45) Date of Patent: Feb. 26, 2013

(54) SYSTEM AND METHOD FOR DETERMINING USER LANGUAGE INTENT

(75) Inventors: Bruce W. Murphy, Pyrmont (AU); Jordan John Bayliss-McCulloch, Pyrmont (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/308,475

(22) Filed: Nov. 30, 2011

(51) Int. Cl.
*G06F 7/00* (2006.01)
*G06F 17/30* (2006.01)
(52) U.S. Cl. ......................... 707/722; 707/760
(58) Field of Classification Search .................. 707/722, 707/760, 999.003
See application file for complete search history.

(56) References Cited

U.S. PATENT DOCUMENTS

| | | | |
|---|---|---|---|
| 2005/0195173 A1* | 9/2005 | McKay | 345/173 |
| 2009/0234570 A1* | 9/2009 | Sever | 701/200 |
| 2010/0287049 A1* | 11/2010 | Rousso et al. | 705/14.53 |

\* cited by examiner

*Primary Examiner* — Alexey Shmatov
(74) *Attorney, Agent, or Firm* — McDermott Will & Emery LLP

(57) ABSTRACT

A system and machine-implemented method for determining a language intent of a user submitted query is provided. A user query comprising text is received and a location of the user based on the received user query is determined. At least one language usage signal from the text of the user query is identified. A strength of the at least one language usage signal is determined based on the received user query and the determined location of the user. When the strength of the at least one language usage signal is greater than a predetermined threshold, an output language for the query is adjusted based on the language usage signal. Results for the query are returned according to the output language.

10 Claims, 6 Drawing Sheets

Location: Berlin, Germany

Query: bierhaus Munchen
Identified language: German
Language usage strength score: 10/100

502

Location: Berlin, Germany

Query: bar Munich
Identified language: English
Language usage strength score: 90/100

504

Location: Berlin, Germany

Query: bierhaus Munchen
Identified language: German
Language usage strength score: 10/100

502

Location: Berlin, Germany

Query: bar Munich
Identified language: English
Language usage strength score: 90/100

SYSTEM AND METHOD FOR DETERMINING USER LANGUAGE INTENT

BACKGROUND

The present disclosure generally relates to determining user language intent, and, in particular, to determining user language intent based on a received user query via a web-based application.

Individuals abroad are often confronted with the issue of using computers and related web-based applications that operate in languages local to the destinations but foreign to the user. While certain applications may be recognizable by virtue of their graphical layout, the difference in language nevertheless remains a problem to the user of the computer. Thus, it may be desirable to implement a system that determines a user's language intent.

SUMMARY

The disclosed subject matter relates to a machine-implemented method for determining a language intent of a user submitted query. A user query comprising text is received and a location of the user based on the received user query is determined. At least one language usage signal from the text of the user query is identified and a strength of the at least one language usage signal is determined, based on the received user query and the determined location of the user. When the strength of the at least one language usage signal is determined to be greater than a predetermined threshold, an output language for the query based on the language usage signal is adjusted. Results for the query are returned according to the output language.

According to various aspects of the subject technology, a system for determining a language intent of a user submitted query is provided. The system comprises one or more servers connected to one or more client devices (e.g., desktop, mobile, or other compute devices) via a network (e.g., the Internet, a wide area network, a local area network, etc.). The one or more servers is also connected to one or more databases for storing data to be retrieved by the one or more servers and served to the one or more client devices. Each client device comprises a query processing module, a language identification/adjustment module, and a signal strength determination module. A user query comprising text is received and a location of the user based on the received user query is determined by the query processing module. At least one language usage signal from the text of the user query is identified by the language identification/adjustment module. The signal strength determination module determines a strength of the at least one language usage signal based on the received user query and the determined location of the user. When the strength of the at least one language usage signal is determined to be greater than a predetermined threshold, the language identification/adjustment module adjusts an output language for the query based on the language usage signal. Results for the query are returned according to the output language by the query processing module.

The disclosed subject matter also relates to a machine-readable medium comprising instructions stored therein, which when executed by a system, cause the system to perform operations comprising determining a language intent of a user submitted query. A user query comprising text is received. A location of the user based on the received user query is also determined. At least one language usage signal from the text of the user query is identified and a strength of the at least one language usage signal is determined, based on the received user query and the determined location of the user. When the strength of the at least one language usage signal is determined to be greater than a predetermined threshold, an output language for the query based on the language usage signal is adjusted. Results for the query are returned according to the output language.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 5 provides a graphical representation of example determinations of language usage signal strengths.

DETAILED DESCRIPTION

Figure 1:
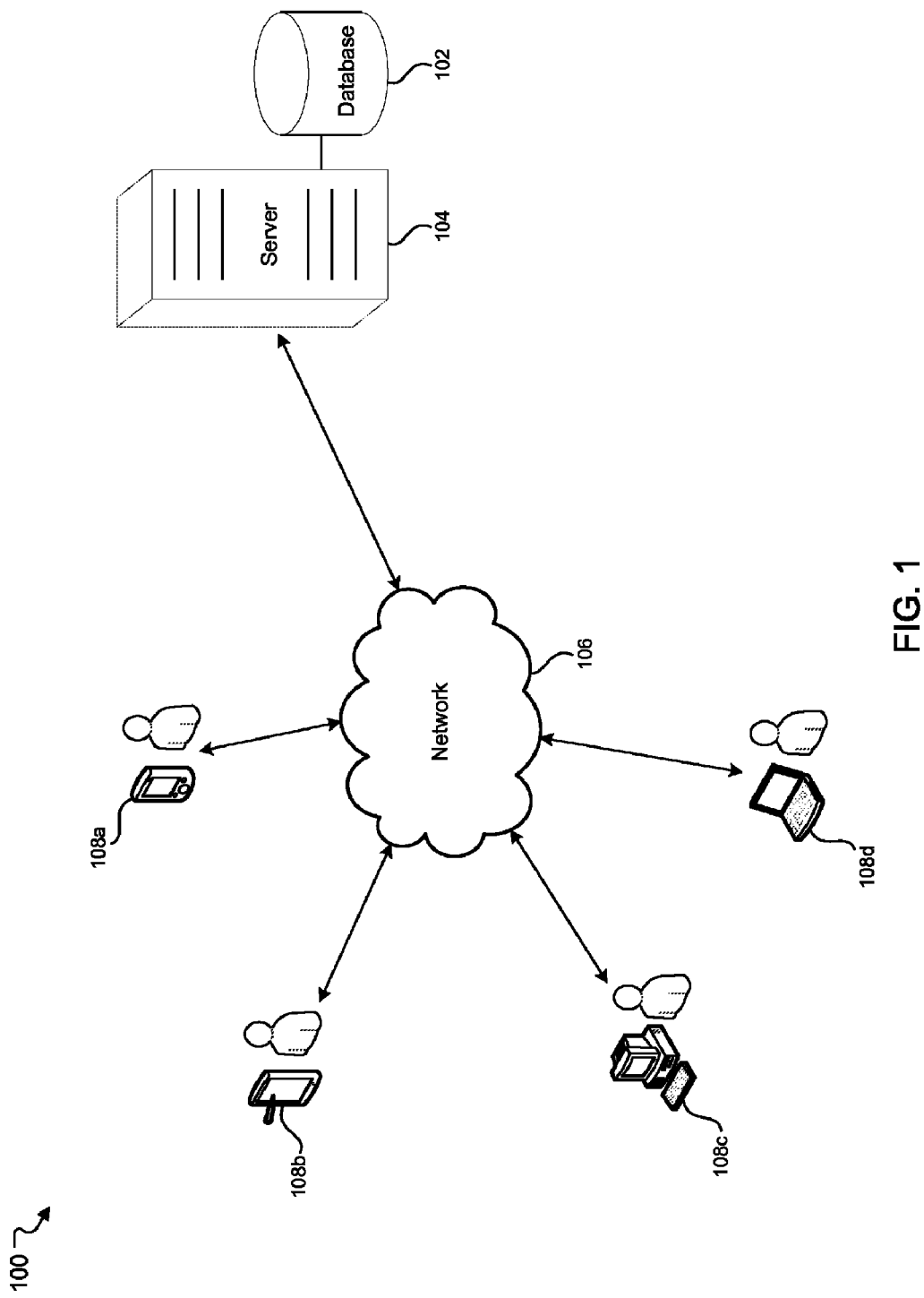
FIG. 1 illustrates an example network environment which provides for determining a language intent of a user submitted query.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter relates to a machine-implemented method for determining a language intent of a user submitted query. A user query comprising text is received and a location of the user based on the received user query is determined. At least one language usage signal from the text of the user query is identified and a strength of the at least one language usage signal is determined, based on the received user query and the determined location of the user. When the strength of the at least one language usage signal is determined to be greater than a predetermined threshold, an output language for the query based on the language usage signal is adjusted. Results for the query are returned according to the output language.

When a user enters a query comprising text, the language of the text is identified and the location of the computing device being used is determined. A language usage signal strength is determined based on the identified language and the location of the computing device. If the signal strength is higher than a predetermined threshold, the output language of the computing device is adjusted to match the identified language. Subsequent query results are returned to the user according to the output language.

Network environment 100 comprises one or more databases 102 (e.g., computer-readable storage devices) for storing a variety of data accessed by web-based applications. The network environment 100 further comprises one or more servers 104. Server 104 may receive queries from user-operated client devices 108a-108d. Server 104 and client devices 108a-108d may be communicatively coupled through a network 106. In some implementations, client devices 108a-108d may request data from server 104. Upon receiving the query, server 104 may retrieve a set of data from database 102 and serve the set of information to client devices 108a-108d.

Each of client devices 108a-108d can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices.

In some aspects, client devices 108a-108d may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108d) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
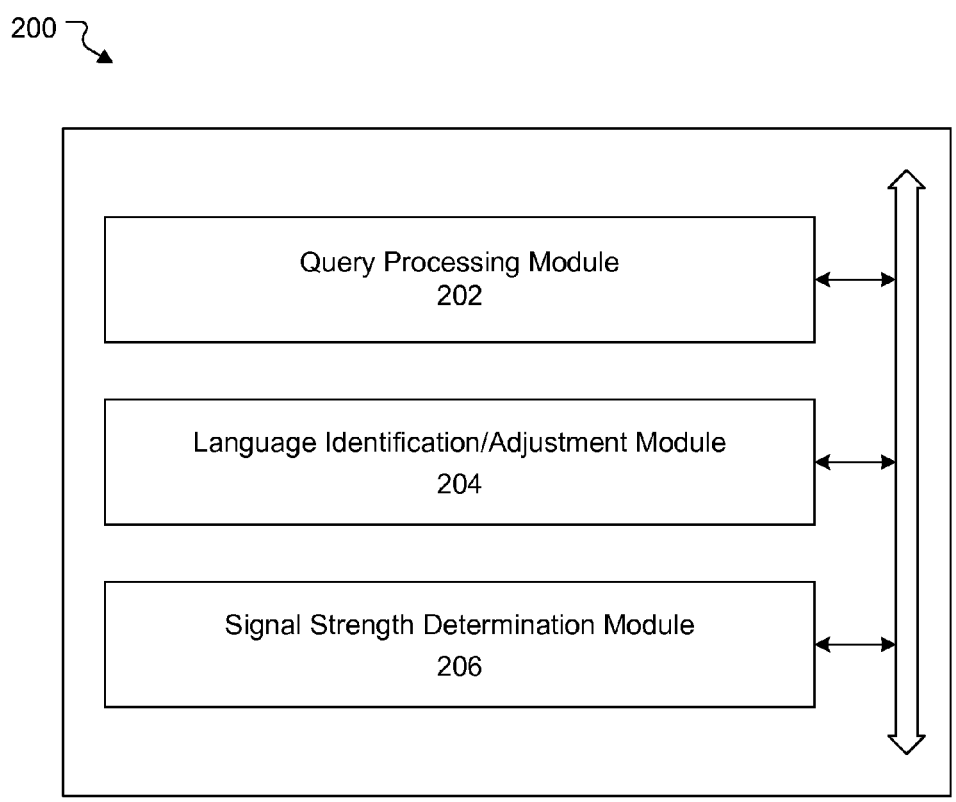
FIG. 2 illustrates an example of a server system for determining a language intent of a user submitted query.

FIG. 2 illustrates an example of a system for determining a language intent of a user submitted query. System 200 includes query processing module 202, language identification/adjustment module 204, and signal strength determination module 206. These modules, which are in communication with one another, process information retrieved from database 102 in order to determine a language intent of a user submitted query. For example, a user entered query may be received by query processing module 202. Query processing module 202 may further determine a location of the user based on the received user query. A language usage signal from the text of the user query is identified by language identification/adjustment module 204. A strength of the language usage signal is determined based on the received user query and the determined location of the user by signal strength determination module 206. When the strength of the at least one language usage signal is determined to be greater than a predetermined threshold, language identification/adjustment module 204 adjusts an output language for the query based on the language usage signal. Results for the query are returned according to the output language by the query processing module.

In some aspects, the modules may be implemented in software (e.g., subroutines and code). The software implementation of the modules may operate on web browsers running on client devices 108a-108d. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
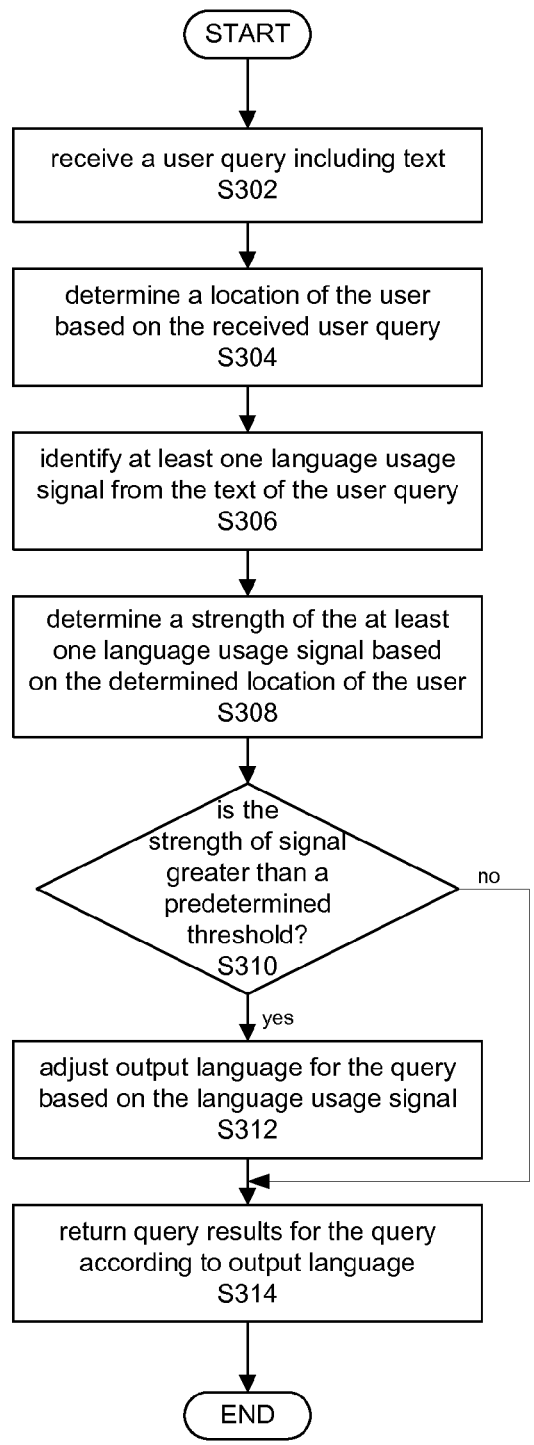
FIG. 3 illustrates an example method for determining a language intent of a user submitted query.

FIG. 3 illustrates example method 300 for determining a language intent of a user submitted query. A user query comprising text is received, according to S302. Based on the received user query, a location of the user is determined, according to S304. At least one language usage signal from the text of the user query is identified, according to S306. In some implementations, the user query may be a search query. For example, an English-speaking individual traveling abroad to Germany may be looking for a local supermarket and enters a search query for "supermarket". In this example, the user's location may be determined based on the location of the computing device (e.g., Germany) on which the query is entered by the user. Additionally, the term "supermarket" may be identified as having a language usage signal associated with English (this term is traditionally spelled "supermarkt" in Germany).

In some implementations, geographically biased proper terms such as a variation of a spelling of a city may be used to identify a language usage signal. For example, the local German spelling for the city of Munich is München. Thus, the use of alternative spellings for München in an area where München is typically used may contribute to the identification of a language usage signal and the determination of the strength of the language usage signal as described in further detail below.

In some implementations, variations in the organization of data such as addresses may be used to identify a language usage signal. For example, in the United States, the structure for an address includes a street number followed by a street name (e.g., 12 Pleasant Street), and city and state/province followed by a postal code (e.g., New York, N.Y. 10012). In certain other countries, street name precedes street number (e.g., Germany), and postal code precedes city and state/province (e.g., Brazil, Mexico, and Italy). Thus, a language usage signal may be identified based on the different organizations of data. Furthermore, the different organizations of data may contribute to the determination of the strength of the language usage signal.

A strength of the at least one language usage signal is determined based on the received user query and the determined location of the user, according to S308. To determine the strength, the language of the identified language usage signal of the user query is compared to a language corresponding to the determined location. In some implementations, a determination that the language of the language usage signal is the same as the language corresponding to the determined location produces a weaker language usage signal strength than a determination that the language of the language usage signal is different from the language corresponding to the determined location. A difference between the language of the identified language usage signal and the language corresponding to the determined location may indicate that the individual entering the query is familiar with a language different from one associated with the location of the computing device used by the individual (i.e., the individual is a foreigner).

Conversely, a similarity between the language of the identified language usage signal and the language corresponding to the determined location may not necessarily be an indication that the individual entering the query is familiar with the same language as that associated with the location of the computing device used by the individual. That is, a user may enter a query of text copied and pasted from a source that utilizes the language local to the computing device, which may not be a language with which the user is familiar. For example, an English-speaking user looking for directions to a bar while in Germany may cut and paste the text of the address into a search query; however, entering the address in a local language (e.g., using München as opposed to Munich in the address) does not necessarily indicate that the user is familiar with the local language, since the user may cut and paste the address from a readily available local source.

The strength of the at least one language usage signal is compared to a predetermined threshold, according to S310. When the strength of the at least one language usage signal is determined to be greater than the predetermined threshold, an output language for the query based on the language usage signal is adjusted, according to S312. In some implementations, the determination of the strength of the language usage signal may be based on variations in the spelling of words in different languages. For example, the corresponding translation of "supermarket" in German is "supermarkt", which differs by an omission of a single letter. In another example, the corresponding translation of "dog" in German is "hund", which is an entirely different spelling. Thus, the strength of the language usage signal in the former example may be weaker than the latter example by virtue of the greater variation in spelling. The stronger language signal in the latter example may indicate a higher confidence in the determination of a user's language intent, as compared to the former example.

Results for the query are returned according to the output language, according to S314. If the output language is not adjusted according to S312, then the output language remains the same as the most recent output language of the computing device. However, if the output language has been adjusted, then the query results are returned in a language according to the adjusted output language. For example, when a user query including text in English has been determined to have a language usage signal strength greater than a predetermined threshold, the output language is adjusted based on this determination to be English, and subsequent results of the query are presented to the user in English. The adjustment of the output language to English may be maintained on the computing device for a predetermined duration, as described in detail by reference to FIG. 4 below.

Figure 4:
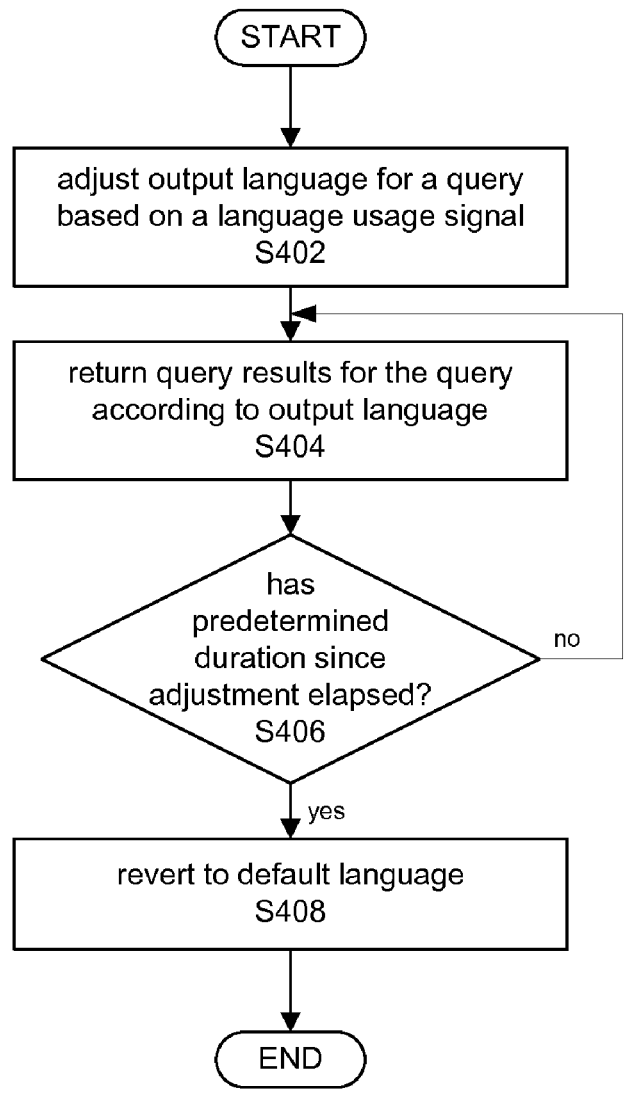
FIG. 4 illustrates an example method for maintaining an adjustment to user language for a predetermined period.

In some implementations, the adjusted output language may be further used to adjust the language of associated information comprising text (e.g., advertisement blocks) displayed on a webpage with the query results. For example, the English-speaking individual traveling abroad to Germany may search for "hotels in Munich". In accordance to method 300, the output language may be adjusted to English and thus, the query results are presented in English. In addition to the results, advertisements on the webpage may also be presented in English. In some implementations, advertisements may be modified through the use of a translation layer applied to the web browser in order to present the advertisement in the adjusted output language. The text of the advertisement may be translated from German to English in this example FIG. 4 illustrates example method 400 for maintaining an adjusted output language on a computing device for a predetermined duration. The output language is adjusted based on a language usage signal, according to S402. Results for a query are returned according to the adjusted output language, according to S404. If a predetermined duration since a last adjustment to the output language has not elapsed, the method reverts back to S404 to return additional query results in the adjusted output language. However, if the predetermined duration has elapsed, then the output language is reverted to the default language of the computing device in S408. By reverting the output language back to the default language may help ensure that the computing device is restored to its original default state after a user session that causes an adjustment to the output language is complete.

FIG. 5 provides two examples of determinations of the strength language usage signals based on the received user query and the determined location of the user. Examples 502 and 504 are search queries determined to have been performed on computing devices in Berlin, Germany. Example 502 shows a user query for "bierhaus München". The language usage signal may be identified as German based on the text of the query. However, since the location of the computing device is in Germany and the query is identified as including text in German, the language usage signal may only produce a strength score of 10/100. As described above, a similarity between the language of the identified language usage signal and the language corresponding to the determined location may not necessarily indicate that the individual is familiar with the same language as that associated with the location of the computing device because the user may enter a query of text copied and pasted from a local source.

Example 504, which shows a user query for "bar Munich", provides an example of an alternate user query. The language usage signal may be identified as English based on the text of the query. Since a difference between the language of the identified language usage signal and the language corresponding to the determined location may indicate that the individual entering the query is familiar with a language different from the one associated with the location of the computing device (i.e., the individual is a foreigner), the language usage signal may produce a strength score of 90/100. While examples 502 and 504 above describe strength scores based on metrics related to the usage of language, other metrics may be used in addition to or in substitution of language, such as differences in the organization of data as described above.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
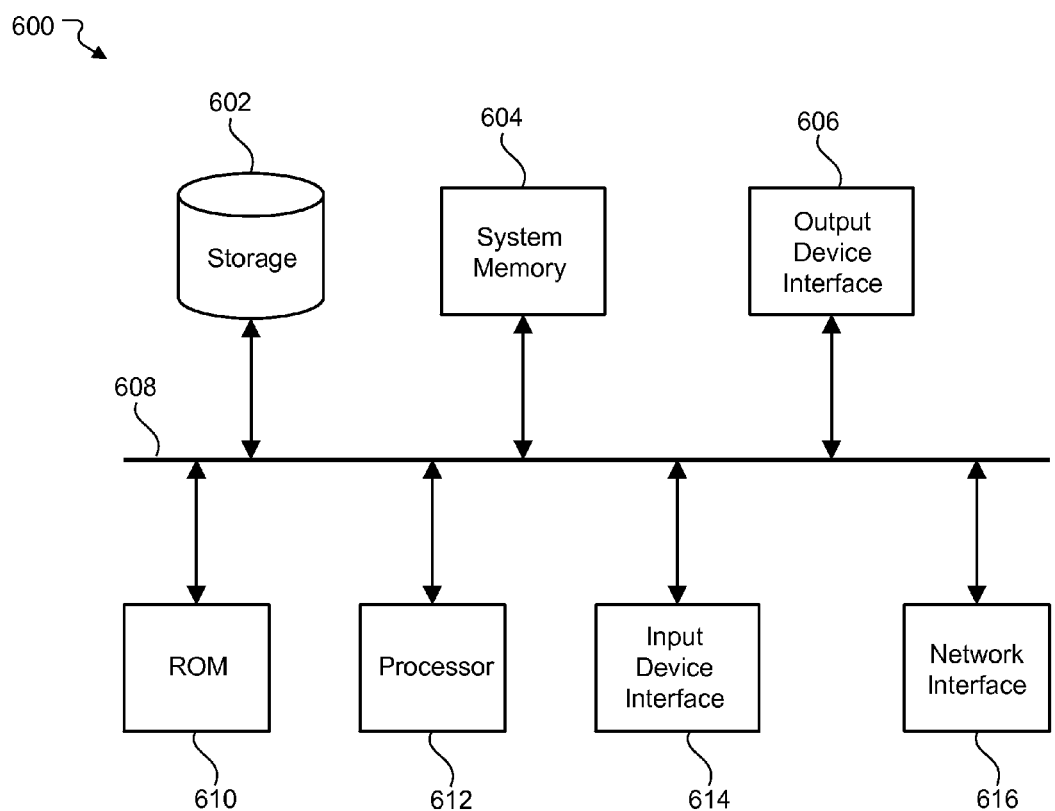
FIG. 6 conceptually illustrates an example electronic system with which some implementations of the subject technology are implemented.

FIG. 6 conceptually illustrates an example electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for determining user language intent in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interface 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method of determining a language intent of a user submitted query, the method comprising:
   receiving a user query comprising text, wherein the text of the user query corresponds to address data comprising two or more components;
   identifying an order in which the two or more components are presented in the address data corresponding to the user query, wherein different orders in which two or more components of address data are presented correspond to different geographical regions with different associated languages;

determining a location of a user based on the received user query;

identifying a language associated with the determined location of the user;

identifying at least one language usage signal from the text of the user query based on the order in which the two or more components are presented in the address data corresponding to the user query;

determining a strength of the at least one language usage signal based on the received user query and the identified language associated with the determined location of the user by comparing a language corresponding to the at least one language usage signal of the user query to the language associated with the determined location of the user, wherein the language corresponding to the at least one language usage signal of the user query being determined to be a same language as the language associated with the determined location of the user has a weaker language usage signal strength than the language corresponding to the at least one language usage signal of the user query being determined to be a different language from the language associated with the determined location of the user;

adjusting, when the strength of the at least one language usage signal is greater than a predetermined threshold, an output language for the query based on the language usage signal; and returning results for the user query according to the output language.

2. The method of claim 1, wherein the identifying the at least one language usage signal from the text of the user query is based on at least one of a usage of different languages for common terms or a usage of different geographically biased proper terms.

3. The method of claim 1, wherein the two or more components comprise at least two of a street field, a city field, a state field, a province field, a postal code field, and a country field.

4. The method of claim 1, further comprising returning information associated with the results for the user query, the associated information being translated according to the output language.

5. The method of claim 4, wherein the information associated with the results for the user query comprises web-based advertisements.

6. A non-transitory computer-readable medium comprising instructions stored therein, which when executed by a system, cause the system to perform operations comprising:

receiving a user query comprising text, wherein the text of the user query corresponds to address data comprising two or more components;

identifying an order in which the two or more components are presented in the address data corresponding to the user query, wherein different orders in which two or more components of address data are presented correspond to different geographical regions with different associated languages;

determining a location of a user based on the received user query;

identifying at least one language associated with the determined location of the user;

identifying at least one language usage signal from the text of the user query based on the order in which the two or more components are presented in the address data corresponding to the user query;

determining a strength of the at least one language usage signal based on the received user query and the identified language associated with the determined location of the user by comparing a language corresponding to the at least one language usage signal of the user query to the language associated with the determined location of the user, wherein the language corresponding to the at least one language usage signal of the user query being determined to be a same language as the language associated with the determined location of the user has a weaker language usage signal strength than the language corresponding to the at least one language usage signal of the user query being determined to be a different language from the language associated with the determined location of the user;

adjusting an output language for the user query based on the language usage signal when the strength of the at least one language usage signal is greater than a predetermined signal strength threshold;

returning results for the user query according to the output language;

determining an elapsed time since a last adjustment to the output language; and reverting the output language to a default language when the elapsed time since the last adjustment to the output language exceeds a predetermined time threshold.

7. The non-transitory computer-readable medium of claim 6, wherein the two or more components comprise at least two of a street field, a city field, a state field, a province field, a postal code field, and a country field.

8. The non-transitory computer-readable medium of claim 6, further comprising instructions for returning web-based advertisement information associated with the results for the user query, wherein the web-based advertisement information is translated according to the output language.

9. The non-transitory computer-readable medium of claim 6, wherein a higher determined strength of a language usage signal represents a higher confidence in a determination of a user's language intent than a lower determined strength of a language usage signal.

10. A system for determining a language intent of a user submitted search query, the system comprising:

one or more processors; and a non-transitory machine-readable medium comprising instructions stored therein, which when executed by the processors, cause the processors to perform operations comprising:

receiving a search query comprising text, wherein the text of the user query corresponds to address data comprising two or more components;

identifying an order in which the two or more components are presented in the address data corresponding to the user query, wherein different orders in which two or more components of address data are presented correspond to different geographical regions with different associated languages;

determining a location from which the search query is received;

identifying a language associated with the location from which the search query is received;

identifying a language corresponding to the text of the search query based on the order in which the two or more components are presented in the address data corresponding to the user query;

determining a language signal strength based on the language corresponding to the text of the search query and the language associated with the location from which the search query is received by comparing the language corresponding to the text of the search query to the language associated with the location from which the search query is received, wherein the language corresponding to the text of the search query being determined to be a same language as the language associated with the location from which the search query is received has a weaker language signal strength than the language corresponding to the text of the search query being determined to be a different language from the language associated with the location from which the search query is received;

adjusting an output language to the identified language when the language signal strength is greater than a predetermined signal strength threshold;

returning results for the search query according to the output language.

* * * * *